Dec. 27, 1966   E. V. BUNTING ET AL   3,294,179
DRAFT CONTROL SYSTEM WITH INDEPENDENT RANGE
AND SENSITIVITY ADJUSTING MEANS
Filed June 9, 1964   2 Sheets-Sheet 1

INVENTORS.
ERNEST V. BUNTING &
BY   HANS V. LIND

ATTORNEYS.

Dec. 27, 1966 E. V. BUNTING ET AL 3,294,179
DRAFT CONTROL SYSTEM WITH INDEPENDENT RANGE
AND SENSITIVITY ADJUSTING MEANS
Filed June 9, 1964 2 Sheets-Sheet 2

INVENTORS.
ERNEST V. BUNTING &
BY HANS V. LIND

ATTORNEYS.

United States Patent Office 3,294,179
Patented Dec. 27, 1966

3,294,179
DRAFT CONTROL SYSTEM WITH INDEPENDENT RANGE AND SENSITIVITY ADJUSTING MEANS
Ernest V. Bunting, Detroit, and Hans V. Lind, Royal Oak, Mich., assignors to Massey-Ferguson Inc., Detroit, Mich., a corporation of Maryland
Filed June 9, 1964, Ser. No. 373,633
12 Claims. (Cl. 172—10)

This invention relates generally to control systems for agricultural tractors and more particularly concerns an improved draft control linkage having adjustable draft range and sensitivity for controlling the operation of the tractor embodying the "Ferguson" type of hitch linkage.

Basically, the well-known Ferguson system comprises a tractor with trailingly pivoted draft links that can be hydraulically lifted. The hydraulic lifting action is regulated through a control valve by draft force feedback so as to maintain a desired draft loading on the tractor as selected by a manual control lever.

As tractors and tractor engines have increased in size and power, larger ad larger implements have been adapted for coupling to the basic hitch linkage. Moreover, a great variety of implements ranging from heavy draft implements to small semimonuted implements of relatively low draft characteristics have been developed for interchangeable use with these tractors. Each of these various types and sizes of implements, of course, produces a different draft loading on the tractor during operation. In the past, however, the draft control linkage for such tractors has been designed principally to accommodate the heaviest of the draft type implements. Moreover, the range of draft load settings and the sensitivity of the control system required for lighter implements have been greatly compromised due to the limited amount of movement normally afforded by the operator control lever.

Accordingly, it is the primary aim of the present invention to provide a tractor draft control linkage having individual range and sensitivity adjustments in addition to the usual manual control lever so that the tractor can readily accommodate a wide variety of implement sizes and types having different draft characteristics.

It is also an object to provide an improved draft control linkage in which both tension and compression forces exerted by the implement on the linkage cooperate with a manual control lever to control the draft load and wherein the linkage is adjustable so that the range of draft forces controlled by the manual lever can be conveniently altered to suit various types and sizes of implements.

It is another object to provide a draft control linkage of the above type with means for adjusting the mechanical advantage of the linkage so that the sensitivity of the manual control lever to draft forces exerted by different implements can be independently and selectively altered.

A further object is to provide a control system as described above in which the range and sensititvity adjustments may be quickly and conveniently made by the tractor operator from the tractor seat.

Yet another object is to provide an improved control system of the above character which is reliable, easily assembled and adjusted and which is also easily understood and convenient to use by the tractor operator.

Other objects and advantages of the invention will become more readily apparent upon reading the following detailed description and upon reference to the drawings, in which.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
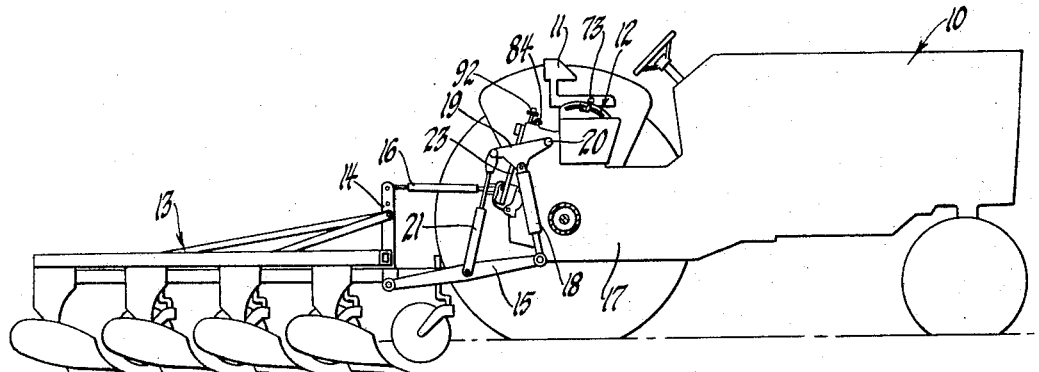
FIGURE 1 is a side elevation of a tractor-implement combination embodying the improved control system of the present invention with the tractor having its near side drive wheel removed.

Turning first to FIGURE 1, there is shown a tractor 10, having an operator's seat 11 and a control console 12 coupled to a draft implement, in this case a moldboard plow 13. The plow 13 carries the usual forward A-frame 14 and is mounted on the tractor 10 through a pair of lower draft links 15 and an upper control link 16, the links being pivotally secured on the rear of the tractor which is defined by a housing 17.

The draft links 15, only one of which is shown in FIG. 1, are arranged to be hydraulically lifted by a pair of hydraulic actuators 18 anchored at their lower ends to the tractor housing 17 and pivotally secured at their upper ends to respective ones of a pair of lift arms 19. The lift arms 19 are mounted on a rock shaft 20 journalled in the tractor housing 17 and are connected by respective drop links 21 to the draft links 15. Supplying hydraulic fluid under pressure to the actuators 18 extends the actuators and swings the lift arms 19 upwardly so as to lift the hitch linkage and implement 13 through the drop links 21.

Figure 2:
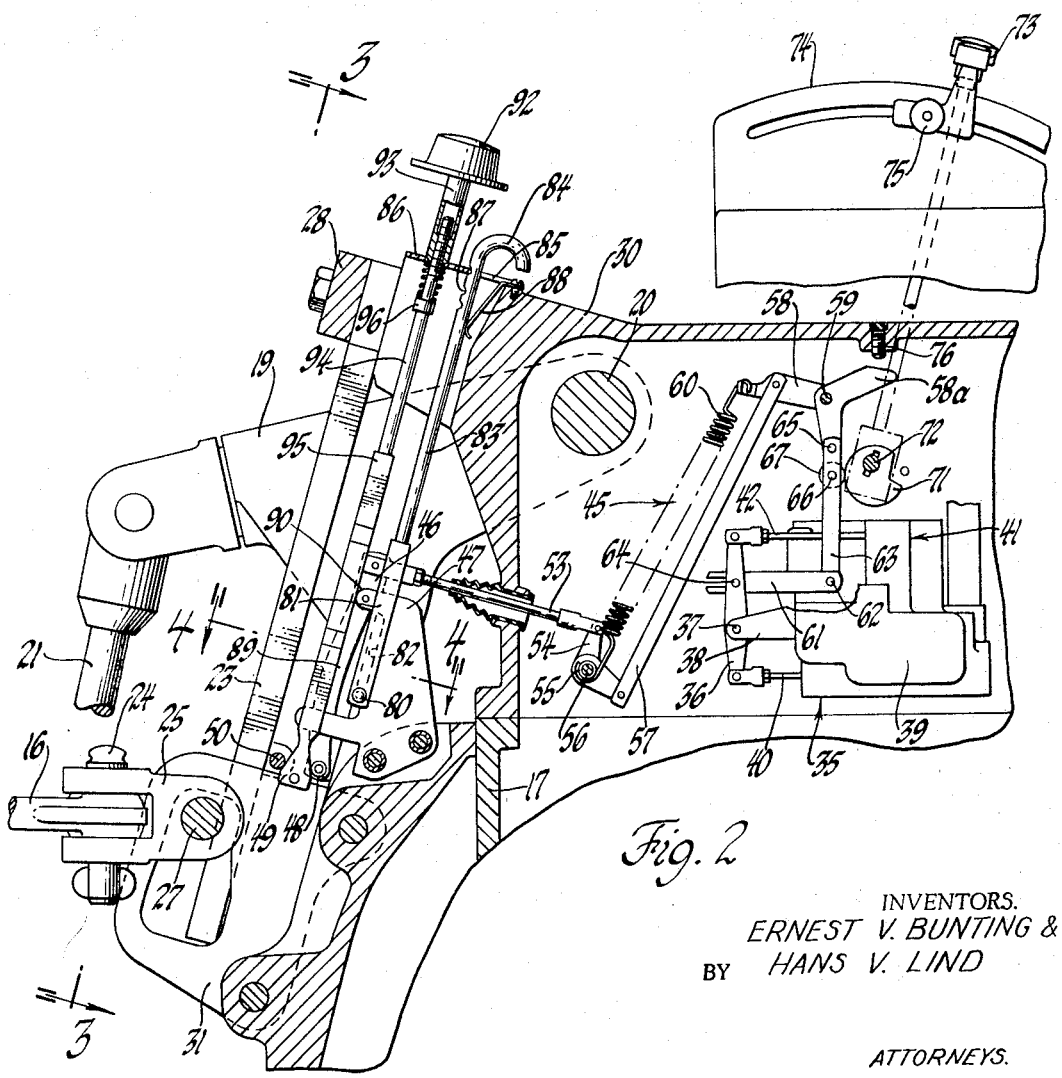
FIG. 2 is an enlarged fragmentary section taken through the rear housing of the tractor to illustrate the draft control linkage.
Figure 3:
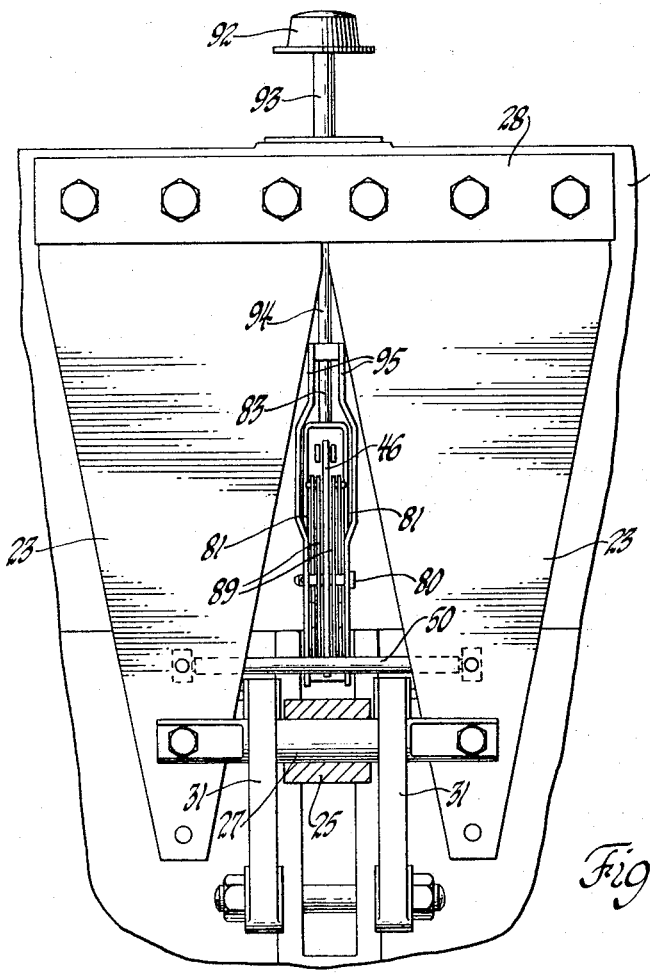
FIG. 3 is an enlarged fragmentary section taken substantially along the line 3—3 in FIG. 2.
Figure 4:
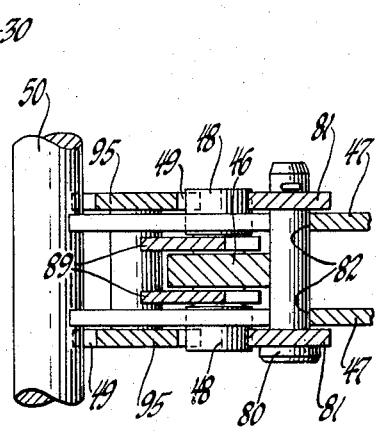
FIG. 4 is a fragmentary section on an even larger scale taken substantially along the line 4—4 in FIG. 2.

In order to provide a mechanical motion reflecting the draft load on the hitch linkage, the forward end of the upper control link 16 is secured to the tractor 10 through a pair of cantilever supported leaf springs 23 (see FIGS. 2 and 3). The forward end of the control link 16 is secured by a pin 24 to a clevis 25 apertured at its forward end to receive a bar 27 which is bolted across the lower ends of the springs 23. The upper ends of the springs 23 are secured by a strap plate 28 to the rear of a cover 30 that forms the upper end of the tractor housing 17. As shown in FIG. 3, the springs 23 are tapered in width so as to provide strength where they are mounted on the tractor as well as sufficient elasticity to serve as a flexible mounting for the front end of the control link 16.

Compression forces in the control link 16 flex the springs 23 in a counterclockwise direction as seen in FIG. 2, and tension forces in the link bend the lower ends of the springs 23 to the left in FIG. 2 or in a clockwise direction. Preferably, the bar 27 passes through a pair of apertured guard plates 31 which are bolted to the rear portion of the tractor housing 17 between the lower ends of the springs 23 and serve as stops limiting the flexure of the springs exerted through the top control link 16.

Fluid supplied to the actuators 18 is controlled by a main control valve indicated generally at 35 mounted inside the housing cover 30 of the tractor. Pressure fluid is supplied to the valve 35 from a suitable pump (not shown) which serves as a source of fluid under pressure. Preferably, the valve 35 is biased in a raising or fluid admitting direction so that pressure fluid is normally directed from the pump to the actuators thereby raising the hitch linkage.

To move the valve 35 against its bias, a control lever 36 is pivoted on a pin 37 sleeved in a bracket 38 forming a portion of the valve body 39. The lower end of the control lever 36 is coupled through a linkage 40 to the valve plunger. In the present instance, the upper end of the control lever is coupled to a pressure control device 41 through a linkage 42 to permit selective operation of the valve 35 in response to changes in hydraulic pressure in the system. For a more complete discussion concerning the pressure control device, reference may be made to our copending application Serial No. 360,663, filed April 7, 1964.

Movement of the valve control lever 36 in a counterclockwise direction as seen in FIG. 2 urges the main valve 35 against its bias and toward its right-hand, or lowering position. Conversely, movement of the valve lever in a clockwise direction permits the valve to move towards its left-hand, or raising position, to supply pressure fluid to the actuators 18.

The hydraulic control system includes a draft control linkage 45 (see FIGS. 2 and 3) responsive to draft loads on the hitch linkage and having a one-way connection with the main control valve 35 for movement of the valve in opposition to the bias of the valve spring. The linkage 45 includes a finger-like element 46 suspended between a pair of plates 47 secured on the rear of the tractor housing 17. The lower end of the finger 46 carries a roller 48 engaging one side of a pair of tapered cam elements 49 with the other side of the cam elements engaging a follower rod 5 carried by the depending ends of the springs 23. A link 53, adjustable in length, passes through the housing cover 30 and connects the finger 46 to a first bell crank 54 which includes a sleeve 55 rotatably carried on a shaft 56 mounted on the cover 30. A second link 57 connects the bell crank 54 to a second bell crank 58 that includes a sleeve journalled on a shaft 59 which is also mounted in the housing cover 30. A helical spring 60 is tensioned by the sleeve 55 and the bell crank 58 so as to bias the bell crank 58 counterclockwise and thus exert a resilient force holding the follower 48 to the left in FIG. 2 and urging the tapered cam elements 49 against the follower rod 50 on the springs 23.

As pointed out above, the bar 27 moves as a result of the draft loading on the hitch linkage which is reflected by tension or compression in the upper control link 16 and the proportional deflection of the tapered springs 23. Movement of the bar 27, through the draft control linkage 45 thus results in rotation of the bell crank 58 and this provides a draft load feedback to the main control valve 35.

The one-way connection in the linkage 45 is provided by a slide 61 suspended by a pivot pin 62 on the lower end of a draft control lever 63. The slide 61 has a forked rear end embracing a pin 64 mounted on the main control valve lever 36. The draft control lever 63 is pivoted on a pin 65 to the bell crank 58, and is fulcrumed by a pin 66 and roller 67. It can thus be seen that clockwise rotation as shown in FIG. 2 of the draft control lever 63 about the fulcrum pin 66 is effective, through the slide 61 to rotate the main valve lever 36 in a counterclockwise direction. The forked end of the slide 61 permits the valve lever 36 to pull away from the slide and swing counterclockwise without movement of the draft control lever 63 and the slide 61.

The function of the draft cotrol linkage 45 will be plain to those familiar with this art. For example, a lessened draft load on the tractor hitch linkage results in a reduction in the compressive force carried by the control link 16 so that the springs 23 relax proportionally in a clockwise direction, resulting in a clockwise follow-up movement of the finger 46. This rotates the bell crank 54 in a clockwise direction and, through the link 57, the bell crank 58 is rotated counterclockwise to pivot the draft control lever 63 in a clockwise direction about the pivot pin 66. This movement carries the slide 61 to the left as seen in FIG. 2 so as to swing the main valve control lever 36 counterclockwise and urge the valve toward its right-hand, or lowering position, against the biasing force of the valve spring. As a result, fluid is exhausted from the actuators 18 and the hitch linkage is lowered until a greater draft force is developed, whereupon compression in the top link 16 is increased, the bar 27 shifted to the right, and the draft control linkage 45 restored to its original position holding the main valve 35 in its neutral or locking position.

To permit selection of the desired draft load to be maintained by the draft control linkage, a linkage is selectively positioned with respect to the main control valve 35 so as to vary the draft load required to shift the valve to its holding position against the bias of the valve spring. For this purpose, the arm 63 is provided with the roller 67 which cooperates with a cam 71 mounted eccentrically on a rotatable control shaft 72 journalled in the housing cover 30. Clockwise movement of the cam 71 as seen in FIG. 2, shifts the arm 63 to the left so as to swing the main valve control lever 36 in a counterclockwise direction and shift the valve toward the right in its link lowering position. As a result, the hitch linkage is lowered and an increased draft is developed until the resulting change in the deflection of the springs 23 turns the bell crank 58 clockwise about the shaft 59 so as to pivot the draft control lever 63 in a counterclockwise direction and thereby permit the valve control spring to restore the main control valve 35 to its neutral position. Counterclockwise movement of the cam 71 allows the main control valve to shift into its raising position so that the hitch linkage is elevated until the decreased draft loading rocks the bell crank 58 counterclockwise to restore the valve control lever 36 and thus the main control valve 35 to their neutral positions.

Movement of the cam 71 is under control of a manual operator's lever 73 disposed adjacent a quadrant 74 on the control console 12. The lever 73 is secured to the control shaft 72 which mounts the cam 71. Thus, clockwise movement of the lever 73 (as seen in FIG. 2) moves the cam in the same direction and urges the valve 35 toward a link lowering position and counterclockwise movement allows the valve to shift toward its raising position. A locator knob 75 on the quadrant 74 may be positioned so that the operator can quickly return the lever 73 to a preselected position.

Preferably, a stop screw 76 is adjustably threaded into the top of the housing cover 30 so as to abut an arm 58a of the bell crank 58 and thus establish a limit position for the draft control linkage 45. Engagement between the arm 58a and the stop screw 76 stops the tension follow-up of the draft control linkage 45 and increased tension in the control link 16 simply causes the rod 50 to pull away from the finger 46. When the lever 73 is moved fully to the rear, cam 71 is rotated counterclockwise to permit movement of the valve 35 to intake and the stop 76 limits the tension follow-up to cause raising of the implement to transport position regardless of the draft forces and to allow heavy implements to be transported on the tractor hitch linkage without affecting the main control valve 35 regardless of how large the tension is in the control link 16. Therefore, even though a heavy implement tends to bounce on the elevated hitch linkage, the varying tension in the top link 16 and the resulting deflection of the springs 23 does not send a feedback signal through the draft control linkage 45 since the rod 50 is then pulled away from the finger and hence there is no undesirable cycling of the main control valve 35. It should be noted that the top one-fourth of the quadrant range provides for movement of the valve 35 by lever 73 from a neutral position to a closed position whereas the bottom three-fourths of the quadrant range provides for movement of the valve 35 in accordance with both the position of lever 73 and the draft control linkage 45.

In accordance with the present invention, the draft control linkage 45 includes provision for altering the sensitivity with which the main control valve 35 responds to changes in the respective tension and compression forces exerted by the control link 16 through the springs 23. It will be appreciated, of course, that when a relatively light, low draft producing implement is coupled to the tractor, it is desirable to increase the sensitivity of the draft control linkage 45 so that the depth fluctuations of the low draft producing implement can be more accurately controlled by the manual operator lever 73. On the other hand, when a heavy, high draft producing implement is coupled to the tractor, less sensitivity in the draft control linkage 45 is necessary since each increment of depth change of the implement produces a relatively high draft force feedback signal. Accordingly, to afford accurate control of both high and low draft producing implements, the present invention includes means for changing the draft control linkage sensitivity independently of the manual control lever 73.

Figure 5:
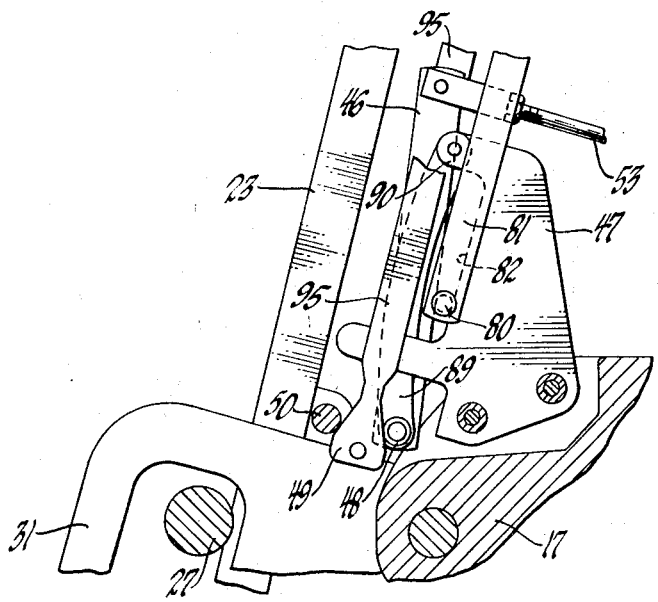
FIG. 5 is a further enlarged section of a portion of the control linkage illustrated in FIG. 2.

In the preferred embodiment, the sensitivity change is achieved through movement of the fulcrum about which the finger element 46 rotates. As best shown in FIGS. 2 and 5, the finger 46 is fulcrumed against a pin 80 interconnecting the lower ends of a pair of links 81 with the pin 80 disposed against a recessed portion 82 of the brackets 47. Thus, by shifting the fulcrum pin 80, the lengths of the moment arms on opposite sides of the fulcrum are effectively altered thereby changing the mechanical advantage and the relative distances travelled by the upper and lower ends of the finger 46 in response to deflection of the springs 23. The recessed portion 82 of the brackets 47 is preferably formed to define a guide surface generally parallel to the operating position of the finger 46. It will be understood, of course, that the finger 46 is maintained in contact with the pin 80 and the pin 80 in contact with the recessed portions 82 by the action of the biasing spring 60 in the draft control linkage 45.

To permit the tractor operator to conveniently change the sensitivity of the draft control linkage, the links 81 supporting the fulcrum pin 80 are coupled to a control rod 83 extending upwardly adjacent the rear end portion of the tractor housing cover 30. Desirably, the control rod 83 is formed with a handle-like portion 84 adjacent its upper end to permit easy manipulation by the tractor operator. The control rod 83 extends upwardly through an aperture 85 formed in a guide plate 86 secured to the housing cover 30. A plurality of notches 87 formed on the upper portion of the control rod 83 are engageable with the cover plate 86 to maintain the control rod in the position selected by the tractor operator. A small leaf spring 88 biases the upper end of the control rod against the plate 86 to maintain one of the notches 87 in engagement with the plate.

Upward movement of the control rod 83 by the tractor operator from the position shown in FIG. 2 raises the fulcrum pin 80 along the inclined surfaces of the recessed brackets 82. Raising the fulcrum pin 80 tends to increase the length of the moment arm on the lower end of the finger 46 while decreasing the moment arm on the upper end of the finger. This change in the relative lengths of the moment arms of the finger 46 serves to increase the amount of movement required by the follower rod 50 on the control springs 23 to produce an equivalent follow-up action in the draft control linkage 45. In other words, upward movement of the control rod 83 decreases the sensitivity of the draft control linkage 45. Conversely, downward movement of the control rod 83 acts to increase the sensitivity of the draft control linkage. It will be understood, of course, that increasing the sensitivity of the draft control linkage makes the valve 35 more responsive to relative changes in deflection of the springs 23 due to draft forces. Accordingly, by altering the sensitivity of the linkage, a small draft force from a low draft producing implement can be rendered as effective as a large draft force from a heavy draft implement.

To insure that changes in the fulcrum 80 of the finger 46 are accurately reflected by changes in the mechanical advantage of the draft control linkage 45, the finger is preferably suspended for pivotal movement about the fulcrum by a pair of drop links 89. As shown in FIGS. 2 and 5, the drop links 89 are pivotally mounted at their upper ends on a pair of ears 90 projecting rearwardly from the brackets 47. The lower ends of the drop links 89 are pivotally connected to the lower end of the finger 46 coaxially with the rollers 48. Desirably, the drop links are formed with their center portions curved slightly rearwardly so that the drop links do not come in contact with the fulcrum pin 80 even when the lower end of the finger is urged to its extreme right-hand position due to a large compressive draft force.

In further accordance with the present invention, provision is also included for extending the range of draft load values that may be controlled by the manual lever 73. It will be appreciated by those skilled in the art that, apart from the varying draft load characteristics of different implements due to depth changes, different implements exert widely varying ranges of draft forces on the tractor draft linkage. A heavy, high draft type implement such as a subsoiler or the like typically produces a large compression force through the top control link 16 when in normal operation. On the other hand, a relatively light weight, low draft producing cultivator or the like may actually exert a negative compression force or tension force in the upper link 16. In order to accommodate differing types of implements, the present invention therefore includes means for altering the range of draft force regulated by the manual lever 73 so that movement of the lever between its draft control limit positions by the tractor operator is effective to accurately control each implement throughout its operating range. Thus, once the range adjustment is set for a given implement, it permits accurate depth adjustments to be made by simply moving the operating lever 73 within the draft control range normally provided by the quadrant 74. Movement of the lever 73 to full up position always causes raising of the implement due to the contour of cam 71.

In the illustrated embodiment, draft range extension is accomplished by altering the effective spacing between the rollers 48 on the lower end of the finger 46 and the follower rod 50 secured to the cantilevered springs 23. As shown in FIGS. 2 and 5, the spacing between these two members is altered by changing the position of the wedge-shaped cam elements 49. Downward movement of the cams 49, of course, decreases the effective spacing between the follower rod 50 and follower rollers 48 permitting the finger 46 to rotate slightly in a clockwise direction as seen in FIGS. 2 and 5 under the biasing action of the spring 60. It will be recalled that clockwise movement of the finger 46 tends to move the valve 35 toward its discharge direction under the influence of the draft control linkage 45. Accordingly, a larger compression force exerted through the top control link 16 is necessary to restore the main control valve 35 to its neutral or balanced position.

To permit the tractor operator to quickly and conveniently change the range of draft values that are controlled by the manual control lever 73, the tapered cams 49 are coupled to an independently adjustable operating element or knob 92 within reach of the tractor operator. In the illustrated embodiment, the knob 92 projects upwardly from the guide plate 86 adjacent the rear portion of the cover plate 30. As shown in FIG. 2, the knob 92 is provided with an internally threaded stem 93 adapted to receive a threaded portion of a rod 94. The lower end of the 94 mounts a pair of depending links 95 whose lower ends define the tapered cams 49. A spring interposed between a shoulder 96 on the rod 94 and the guide plate 86 serves to keep the cams 49 accurately positioned according to the amount of the threaded rod 94 that is drawn through the guide plate 86 by the stem 93 on the control knob.

From the foregoing, it will be appreciated that by rotating the knob 92 the tractor operator can vary the range of draft forces that are effective to shift the valve 35 under control of the manual lever 73. Rotating the knob so as to draw the tapered cams 49 upwardly makes the valve 35 responsive to smaller compression or larger tension forces. Conversely, rotating the knob in the opposite direction to lower the tapered cams makes the valve responsive to larger compression forces such as those exerted by a heavy draft type implement. Since the manual control lever 73 is movable within its limits to regulate the draft force necessary to shift the valve 35, it will be seen that movement of the tapered cams 49 alters the range of the values controlled by the manual lever.

By moving the handle 84 to raise or lower the variable fulcrum 80 of the finger 46, the tractor operator can also change the sensitivity with which the valve 35 responds to the draft forces transmitted through the follow-up linkage 45. In other words, the tractor operator can adjust the follow-up linkage so that movement of the mannual operating lever through a given portion of its range requires a larger or a smaller draft force to be exerted by the implement in order to return the valve to its neutral position. In this way, the depth of implements producing only small draft forces with respect to the depth changes can be effectively regulated as well as the depth of implements which produce large draft forces per increment of depth change.

In the preferred embodiment, the manual control lever 73 is arranged so that when it is moved to a predetermined location adjacent the quadrant 74, and when the valve 35 is moved to its neutral position by a counterbalancing draft force appropriate for that control lever setting, the follow-up finger 46 is then disposed parallel to the guide surfaces 82 on the bracket 47. This parallel relationship is highly advantageous since it permits movement of fulcrum pin 80 in either direction, by adjusting the sensitivity handle 84, without initiating movement of the valve 35 away from its neutral position. Thus, the sensitivity with which the valve 35 responds to fluctuations in draft loads can be altered while the implement is in working position without changing the preselected draft load setting at which the implement is being operated.

In order to permit the tractor operator to conveniently position the manual control lever 73 at the quadrant location which permits sensitivity changes to be made without accompanying valve fluctuations, the locator 75 can be adjustably secured on the quadrant at this position and the lever 73 simply moved into alignment with the locator. It has been found that the preferred location of the lever 73 with respect to the quadrant 74 to establish the above mentioned parallel relationship between the finger 46 and the guide surfaces is a point on the quadrant approximately two-thirds of the distance from the rear of the lower three-fourths of the total quadrant range, to the forward quadrant limit. It will be appreciated, of course, that movement of the lever 73 in the rear two-thirds of the quadrant draft control range is normally effective for controlling tension forces in the top link 16 and movement of the lever in the forward one-third of the quadrant draft control range is normally effective for controlling compression in the top link. In discussing these "normal" tension and compression control ranges for the lever 73, it should be remembered, however, that rotation of the knob 92 effectively changes the nature and magnitude of the draft forces which are controlled by the lever 73. Therefore, these tension and compression ranges are relative in nature, rather than absolute, with respect to the one-third and two-thirds quadrant segments.

By positioning the manual control lever 73 at the preferred location two-thirds of the distance of lever movement from the rear draft control limit, it is possible for the tractor operator to conveniently make both the draft force sensitivity and range adjustments for any of a wide variety of implements which may be coupled to the tractor. A brief explanation of a typical adjusting sequence will now be given.

With an implement coupled to the tractor ready to be lowered for operation in the field, the manual lever 73 is moved adjacent the locator 75 at the two-thirds quadrant position. The implement will then normally descend into ground engaging position as a result of the unbalanced tension force in the top link due to the implement's overhanging weight. As the tractor and implement move forward the implement establishes a working depth which is just sufficient to relieve the unbalanced tension force in the top link due to the draft load exerted by the implement at that depth.

If the tractor operator desires to operate the implement at a different working depth, the control knob 92 may be rotated. It will be recalled that rotation of the knob 92 raises or lowers the wedge-shaped cam elements 49 and thus alters the draft force which is effective, through the draft control linkage 45, to move the valve 35 to a compensating position for a given setting of the manual control lever 73. Thus, downward movement of the cams 49 permits the implement to establish a greater compressive or less tension force in the link 16 and consequently a deeper working depth. Conversely, upward movement of the cams 49 reduces the compressive force or increases the tension force necessary to neutralize the valve 35 and therefore raises the working depth of the implement. The range control knob 92 thus serves as "vernier" depth setting gauge by altering the range of draft forces which are controlled by the manual lever 73.

Once the desired depth has been established by rotation of the range control knob 92, the tractor operator can then select the desired sensitivity with which the valve 35 responds to draft force fluctuations. By moving the sensitivity control handle 84, the location of the fulcrum pin 80 and thus the mechanical advantage of the draft follow-up finger 46 can be changed. Upward movement of the fulcrum pin 80 decreases the sensitivity of the valve 35 in responding to a given draft force change and downward movement of the fulcrum works in the opposite manner. It will be understood, of course, that a low draft producing implement works better if the valve 35 is more sensitive in responding to draft fluctuations, and conversely, a heavy-high draft load implement works better if the valve is less sensitive to draft load changes. Since, in the present example, the sensitivity adjustment is made with the manual control lever 73 at the preferred two-thirds position of the draft control range, the valve balance for the selected depth is not changed.

After the implement working depth has been set by rotating vernier control knob 92 and the sensitivity has been adjusted by moving the sensitivity handle 84, the further operation of the implement may be conveniently controlled by movement of the manual control lever 73. Movement of the lever 73 to the rear reduces the draft load setting, of course, and raises the implement to higher working depth. Conversely, forward movement of the lever 73 increases the draft load setting and lowers the working depth of the implement. In this regard, it has been found that the rear two-thirds of lever movement normally provides an adequate range of lever movement progressing to a maximum tension setting at the rearward limit of lever movement. Similarly, the forward one-third of lever movement normally provides an adequate range controlling the compression draft forces that may be encountered during operation of a given implement.

We claim as our invention:

1. A draft control system for a tractor with a hydraulically operated lift arm under control of a valve having supply, discharge and neutral positions, comprising, in combination, a draft control member mounted on said tractor, said member being proportionately movable in opposite directions in response to tension and compression draft forces exerted by an implement coupled to said tractor, draft follow-up means associated with said member for shifting said valve between said positions in response to changes in said forces, a manual control lever associated with said follow-up means and positionable at a selected setting between opposite limits for regulating the amount of said forces required to shift said valve, said follow-up means including a finger element with one end biased to follow movements of said member and the other end coupled by a linkage to said valve, said finger being mounted for pivotal movement about a fulcrum located intermediate the ends of said finger element and movable along a guide surface defined by a bracket disposed generally parallel to said finger element, and means for selectively locating said fulcrum between said ends of said finger and along said guide surfaces to change the mechanical advantage of said follow-up means whereby the sensitivity of said valve in responding to changes in said forces is altered.

2. A draft control system as defined in claim 1 wherein said fulcrum locating means is coupled to a handle movable by the tractor operator independently of said control level and means are provided for releasably locking said handle in a plurality of sensitivity adjusting positions.

3. A draft control system as defined in claim 1 wherein said finger is pivotally connected at its lower end on a link pivotally suspended on a projection of said bracket located above said guide surface to insure that said finger is freely movable about said fulcrum.

4. A draft control system as defined in claim 3 wherein said link is formed in an accurate shape with the central portion thereof curved generally rearwardly so that interference between said link and said fulcrum is avoided.

5. A draft control system for a tractor with a hydraulically operated lift arm under control of a valve having supply, discharge and neutral positions, comprising, in combination, a draft control member mounted on said tractor, said member being proportionately movable in opposite directions in response to tension and compression draft forces exerted by an implement coupled to said tractor, draft follow-up means associated with said member for shifting said valve between said positions in response to changes in said forces, a manual control lever associated with said follow-up means and positionable between opposite limits for regulating the amount of said forces required to shift said valve, and independently adjustable means associated with said follow-up means for altering the effective length of said follow-up means between said member and said valve so that said lever regulates shifting of said valve in response to a different range of said forces between said limits.

6. A draft control system as defined in claim 5 wherein said independently adjustable means includes a tapered cam element selectively positionable to vary the effective distance between said draft control member and said follow-up means.

7. A draft control system as defined in claim 6 wherein said cam element is coupled to an operating element movable by the tractor operator independently of said manual control lever.

8. A draft control system for a tractor with a hydraulically operated lift arm under control of a valve having supply, discharge, and neutral positions, comprising, in combination, a draft control member mounted on said tractor, said member being proportionately movable in opposite directions in response to tension and compression draft forces exerted by an implement coupled to said tractor, draft follow-up means associated with said member for shifting said valve between said positions in response to changes in said draft forces, a manual control lever associated with said follow-up means and positionable at a selected setting between opposite limits for regulating the amount of said forces required to shift said valve, independently adjustable means associated with said follow-up means for altering the effective length of said follow-up means between said member and said valve so that said manual control lever regulates shifting of said valve in response to a different range of said forces between said limits, and independently movable means coupled to said follow-up means to change the sensitivity with which said valve responds to said forces when said manual control lever is moved to a different selected setting between said limits.

9. A draft control system for a tractor with a hydraulically operated lift arm under control of a valve having supply, discharge and neutral positions, comprising, in combination, a draft control member mounted on said tractor, said member being proportionately movable in opposite directions in response to tension and compression draft forces exerted by an implement coupled to said tractor, draft follow-up means associated with said member for shifting said valve between said positions in response to changes in said draft forces, a manual control lever associated with said follow-up means and positionable at a selected setting between opposite limits for regulating the amount of said forces required to shift said valve, said follow-up means including a finger element with one end biased to follow movements of said member and the other end coupled by a linkage to said valve, said finger being mounted for pivotal movement about a fulcrum intermediate the ends of said finger, a handle coupled to said fulcrum movable by the tractor operator independently of said manual control lever for selectively locating said fulcrum with respect to said ends to change the mechanical advantage of said follow-up means whereby the sensitivity of said valve in responding to changes in said forces is altered, a tapered cam element interposed between said draft control member and said one end of said finger, and an operating element coupled to said cam element and movable by the tractor operator independently of said manual control lever and said handle to vary the effective distance between said draft control member and said follow-up means so that said manual control lever regulates shifting of said valve in response to a different range of said forces between said limits.

10. A draft control system for a tractor with a hydraulically operated lift arm under control of a valve having supply, discharge and neutral positions, comprising, in combination, a draft control member mounted on said tractor, said member being proportionately movable in opposite directions in response to tension and compression draft forces exerted by an implement coupled to said tractor, draft follow-up means associated with said member for shifting said valve between said positions in response to changes in said draft forces, a manual control lever associated with said follow-up means and positionable between opposite limits for regulating the amount of said forces required to shift said valve, said control lever being positionable at one location intermediate said opposite limits whereby the weight of an implement coupled to said tractor produces a tension force in said member sufficient to move said follow-up means and shift valve to discharge position to lower the implement to a depth such that the corresponding draft force transmitted to said member returns said valve to said neutral position, and an independent draft range control associated with said follow-up means, said range control being selectively movable in opposite directions to increase and decrease the effective length of said follow-up means and thereby shift said valve away from said neutral position to said supply and discharge positions so as to raise and lower the implement, respectively, independent of movement of said manual control lever from said one location.

11. A draft control system as defined in claim 10 including independently movable means coupled to said follow-up means to change the sensitivity with which said valve responds to said tension and compression draft forces, said sensitivity means being constructed and arranged so that when said manual control lever is in said one location said sensitivity means is movable in opposite directions to respectively increase and decrease the senstivity with which said valve responds to said forces without moving said valve away from said neutral position.

12. A draft control system for a tractor with a hydraulically operated lift arm under control of a valve having supply, discharge and neutral positions, comprising, in combination, a draft control member mounted on said tractor, said member being proportionately movable in opposite directions in response to tension and compression draft forces exerted by an implement coupled to said tractor, a draft follow-up linkage associated with said member for shifting said valve between said positions in response to changes in said forces, manually adjustable means associated with said linkage for altering the sensitivity with which said valve responds to said forces, first control means associated with said linkage for controlling the magnitude of said forces which are effective to shift said valve, and second control means associated with said linkage for selecting the range of said forces which are controlled by said first control means, said first and second control means being arranged so that said sensitivity means can be adjusted without moving said valve from said neutral position when an implement coupled to said tractor is operated under control of said first and second control means at any of a plurality of draft load settings.

No references cited.

ABRAHAM G. STONE, *Primary Examiner.*

R. L. HOLLISTER, *Assistant Examiner.*